(No Model.)
T. A. JEBB.
METHOD OF MANUFACTURING GRAPE SUGAR.
No. 264,037. Patented Sept. 5, 1882.
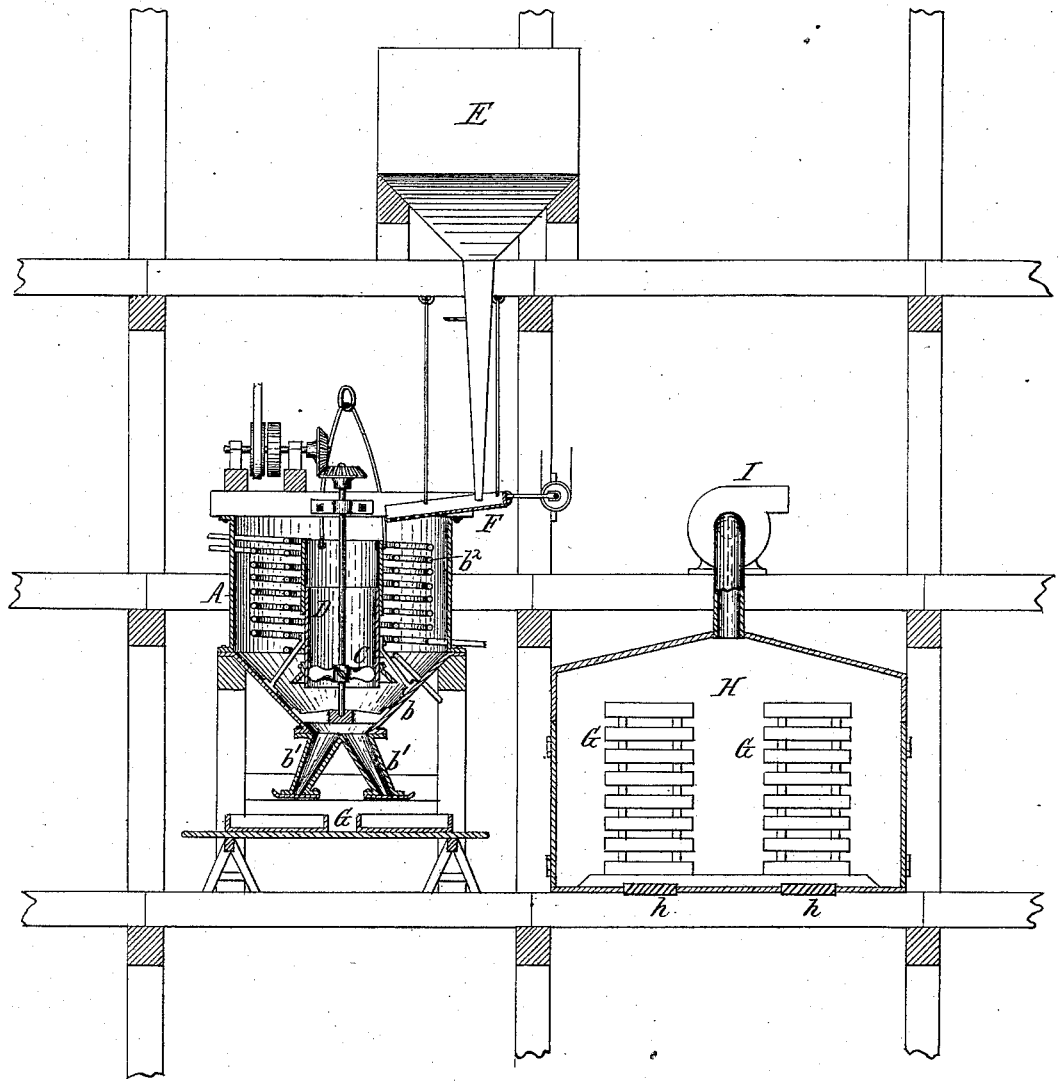
Witnesses.
T. A. Jebb. Inventor.
By Wilhelm Bonner.
Attorneys.
N. PETERS, Photo-Lithographer, Washington, D. C.

UNITED STATES PATENT OFFICE.

THOMAS A. JEBB, OF BUFFALO, NEW YORK.

METHOD OF MANUFACTURING GRAPE-SUGAR.

SPECIFICATION forming part of Letters Patent No. 264,037, dated September 5, 1882.

Application filed July 12, 1882. (No model.)

*To all whom it may concern:*

Be it known that I, THOMAS A. JEBB, of the city of Buffalo, in the county of Erie and State of New York, have invented new and useful Improvements in Method of Manufacturing Grape-Sugar, of which the following is a specification.

The object of this invention is to manufacture dry and hard grape-sugar or block glucose; and my invention consists of mixing with liquid grape-sugar, of the proper gravity to become solid, dry grape-sugar or block glucose, ground, crushed, scraped, pulverized, or otherwise reduced to a finely-divided state, in sufficient quantity to absorb the moisture contained in the liquid grape-sugar, whereby the solidification of the mass is expedited and a dryer and harder sugar produced than heretofore, which grape-sugar is more readily pulverized and less liable to absorb moisture from the atmosphere and become fermented and sour than grape-sugar produced in the various manners heretofore practiced.

The accompanying drawing represents a sectional elevation of an apparatus which may be employed for carrying out my invention.

A represents a mixing apparatus, which receives the liquid grape-sugar, and in which the same is agitated and mixed with dry pulverized grape-sugar. If the liquid grape-sugar is not sufficiently cool, it is caused to circulate in the mixing-machine in contact with a coil through which water flows, or with some other cooling-surface, whereby the liquid grape-sugar is cooled off and prepared for solidification. The liquid grape-sugar has the proper gravity to become solid if permitted to remain in a state of rest. This mixing apparatus is preferably composed of a tank having a conical bottom, $b$, provided with one or more discharge-nozzles, $b'$, which are controlled by suitable valves, and one or more coils of pipe, $b^2$, through which cold water is caused to circulate. An agitating-screw, C, or other suitable agitator is arranged near the bottom of the tank within a cylinder, D, open at the top and bottom, so that the rotation of the agitating-screw causes the liquid grape-sugar or glucose contained in the tank to flow upward through the inner cylinder and outward over the upper end thereof, thence downward along the cooling-coils and inward into the inner cylinder at its lower end, whereby the material contained in the tank is kept in circulation.

E represents a tank or bin designed to contain dry grape-sugar or glucose in a ground, scraped, or pulverized form. From this tank or bin a small portion of the pulverized grape-sugar is delivered into the mixing apparatus A and mixed with the charge of liquid grape-sugar contained therein.

The liquid grape-sugar is preferably placed in the mixing apparatus A in the condition in which it comes from the vacuum-pan or final filter, and is preferably cooled in said mixing apparatus before the dry pulverized grape-sugar is added to the liquid grape-sugar. Any other suitable mixing-machine may be employed for this purpose.

I prefer to mix about one part of dry pulverized grape-sugar with ten parts of liquid grape-sugar; but this proportion may be varied according to the use for which the product is designed and the demands of the trade.

The proportion is, however, so regulated that the admission of the dry grape-sugar with the liquid grape-sugar will cause the entire mixture to solidify or become hard in a very short time without requiring any further treatment for that purpose. The dry grape-sugar is preferably introduced into the liquid grape-sugar by sprinkling the dry pulverized grape-sugar over the surface of the liquid grape-sugar by means of a shaking sieve, F, as represented in the drawing, or by any other suitable mechanism. The dry pulverized grape-sugar serves to hasten the solidification of the liquid grape-sugar, and the product derived from this process is a very dry, hard, and brittle grape-sugar, which is obtained in much less time than heretofore, and which is, by reason of its hardness and brittleness, more readily ground, crushed, scraped, or pulverized than the solid grape-sugar heretofore manufactured, which is always more or less gummy.

The grape-sugar so produced is also much less liable to absorb moisture from the atmosphere, and therefore not so apt to ferment or turn sour in hot weather, and is therefore better fitted to be mixed with cane-sugar or beet-sugar.

When the mixture in the mixing apparatus A has assumed the consistency of thick cream it may be drawn off into barrels or packages, in which it may be placed upon the market; but when the sugar is designed to be used in a crushed, scraped, or ground condition I prefer to draw the mixture into pans or molds G of suitable size to form the sugar into slabs, cakes, or bars. These molds or forms, when filled, are preferably placed in a cooling-room, H, in or through which air is caused to circulate by an exhaust-pan, I, or any other suitable device—such as a blast-fan, pump, or chimney—and whereby the grape-sugar in the molds is rapidly dried and cooled. Air is admitted to the chamber H through registers or openings $h$ in its bottom, or in any other suitable manner. When the grape-sugar has become sufficiently solid it is taken out of the pans or molds, and the slabs, cakes, or bars are then placed in the cooling-room H in such a manner as to obtain a free circulation of air between them, whereby the hardening and drying process is completed. The grape-sugar may be sold in this condition, and be broken, ground, or crushed afterward; or it may be first ground, crushed, or scraped in any suitable grinding, crushing, or disintegrating-mill or scraping-machine, and be sold in that condition; or, after having so been ground, crushed, or scraped, it may be mixed with granulated or pulverized cane or beet sugar, as the demands of the trade may require.

I am aware that it has been proposed to add a minute quantity of finely-divided anhydride of grape-sugar to a watery solution of ordinary commercial grape-sugar for the purpose of causing the anhydride of grape-sugar to crystallize out of this solution, and that it has been proposed to mix about one per cent. of finely-powdered grape-sugar with the sirup, then to allow the grape-sugar to crystallize out of the mother-liquor, and then to separate the mother-liquor from the crystallized sugar in a centrifugal machine or under a suitable press; and I do not claim these methods, as they are essentially different from my invention; but

I claim as my invention—

1. The method of manufacturing hard and dry grape-sugar which consists in mixing with liquid grape-sugar, of the proper gravity to become solid, dry grape-sugar, scraped, ground, or otherwise reduced, in sufficient quantity to cause the entire mass to become hard and dry, substantially as set forth.

2. The method of manufacturing hard and dry grape-sugar which consists in first agitating and cooling the liquid sugar, then delivering the cooled semi-liquid sugar into suitable pans or molds, and finally exposing the sugar to an artificial air-current, substantially as set forth.

T. A. JEBB.

Witnesses:
  JNO. J. BONNER,
  CHAS. F. GEYER.